Aug. 23, 1966 M. A. ODOM 3,268,666

CALL DIVERTOR TRANSLATORS

Filed Aug. 6, 1962 5 Sheets-Sheet 1

INVENTOR
MARTIN A. ODOM

BY Philip A. Friedell

ATTORNEY

INVENTOR
MARTIN A. ODOM
BY
Philip A. Friedell
ATTORNEY

INVENTOR
MARTIN A. ODOM
BY
Philip A. Friedell
ATTORNEY

Aug. 23, 1966 M. A. ODOM 3,268,666

CALL DIVERTOR TRANSLATORS

Filed Aug. 6, 1962 5 Sheets-Sheet 4

INVENTOR
MARTIN A. ODOM

BY

Philip A. Friedell

ATTORNEY

Aug. 23, 1966 M. A. ODOM 3,268,666

CALL DIVERTOR TRANSLATORS

Filed Aug. 6, 1962 5 Sheets-Sheet 5

Inventor
Martin A. Odom
By Philip A. Friedell
Attorney

United States Patent Office 3,268,666

Patented August 23, 1966

3,268,666

CALL DIVERTOR TRANSLATORS

Martin A. Odom, 302 Oakland Ave., Oakland 2, Calif.

Filed Aug. 6, 1962, Ser. No. 215,245
7 Claims. (Cl. 179—18)

This invention relates to improvements in telephone call transfer means, and provides a system in which, through the use of two telephone service lines in communication with a telephone exchange, and with at least one of the service lines equipped with a telephone, outgoing and incoming calls may be handled in a normal manner, or permitted to automatically translate and dial the call to another telephone installation.

Furthermore, through the installation of a telephone on the other line, that telephone can also be used for both, incoming and outgoing calls, and upon the closing of a translation circuit, the call will be automatically biased to the translating and dialing circuit for diversion to another telephone installation through a central exchange, though it may be advisable to limit the latter telephone installation to outgoing calls so as not to interrupt the diversion of a call over that line to another selected telephone installation.

With my invention, a party can dial the subscribers telephone number, the subscriber having adjusted his diverting unit for the number of the telephone to which he wishes the calls to be transferred, or even to a remote point, such as another city or area by including the area code in the number, and thereby receive all calls direct while he is absent from his normal location, placing the caller in direct communication without requiring any advance notice to callers.

Furthermore, where an alarm system or systems are already installed, or through the installation of such alarm systems, my invention will automatically initiate a series of coded audio signals, and coincidently dial the signals to the telephone installation for which the apparatus is adjusted, and is therefore capable of providing, in addition to the translation and extension of calls, a general protection system.

The objects and advantages of the invention are as follows:

First, to provide means for automatically transferring a telephone call to a subscriber's telephone to a remote telephone under a different telephone number.

Second, to provide means as outlined through the medium of which an incoming call will be automatically translated to a different telephone number and diverted to a second service line through manual completion of a translating and dialing circuit after the incoming call has been answered through the subscriber's telephone.

Third, to provide means as outlined operable through the medium of two telephone service lines, each including a telephone installation, either or both of which may be used for normal transmission and reception of calls.

Fourth, to provide the translating and dialing apparatus with adjustable digit setting elements which are set selectively to the respective digits of the telephone number to which a call is to be transferred, and which exhibits the respective digits of the new number, and which elements are maintained for all incoming calls until manually released or changed to a different telephone number.

Fifth, to provide manually operable means for releasing the adjustable elements as a unit and including means for returning the adjustable elements to normal non-translating position.

Sixth, to provide visual indicating means for identifying the called telephone, and also for the answering of the call, either directly, or through the diverted call.

Seventh, to provide means whereby incoming calls will automatically be transferred from either service line to the other service line.

Eighth, to provide means maintaining the normal ringing operation of the line called until the translated and forwarded call has been answered.

Ninth, to provide means for maintaining an incoming toll call until the call has been diverted and answered, for limitation of toll charges as provided for answered calls only.

Tenth, to provide a system as outlined, which is addition to normal operation, and local and remote call transfer, also provides an alarm system against fire, burglary and other emergencies, through conventional alarm installations.

In describing the invention reference will be had to the accompanying drawings, in which.

The invention includes two telephone service lines at least one of which includes a conventional telephone installation, in conjunction with call translating apparatus and control means therefor, dialing means, a source of potential, and circuits therefor and including an alarm integrating circuit in connection with the dialing apparatus.

Figures 1, 5:
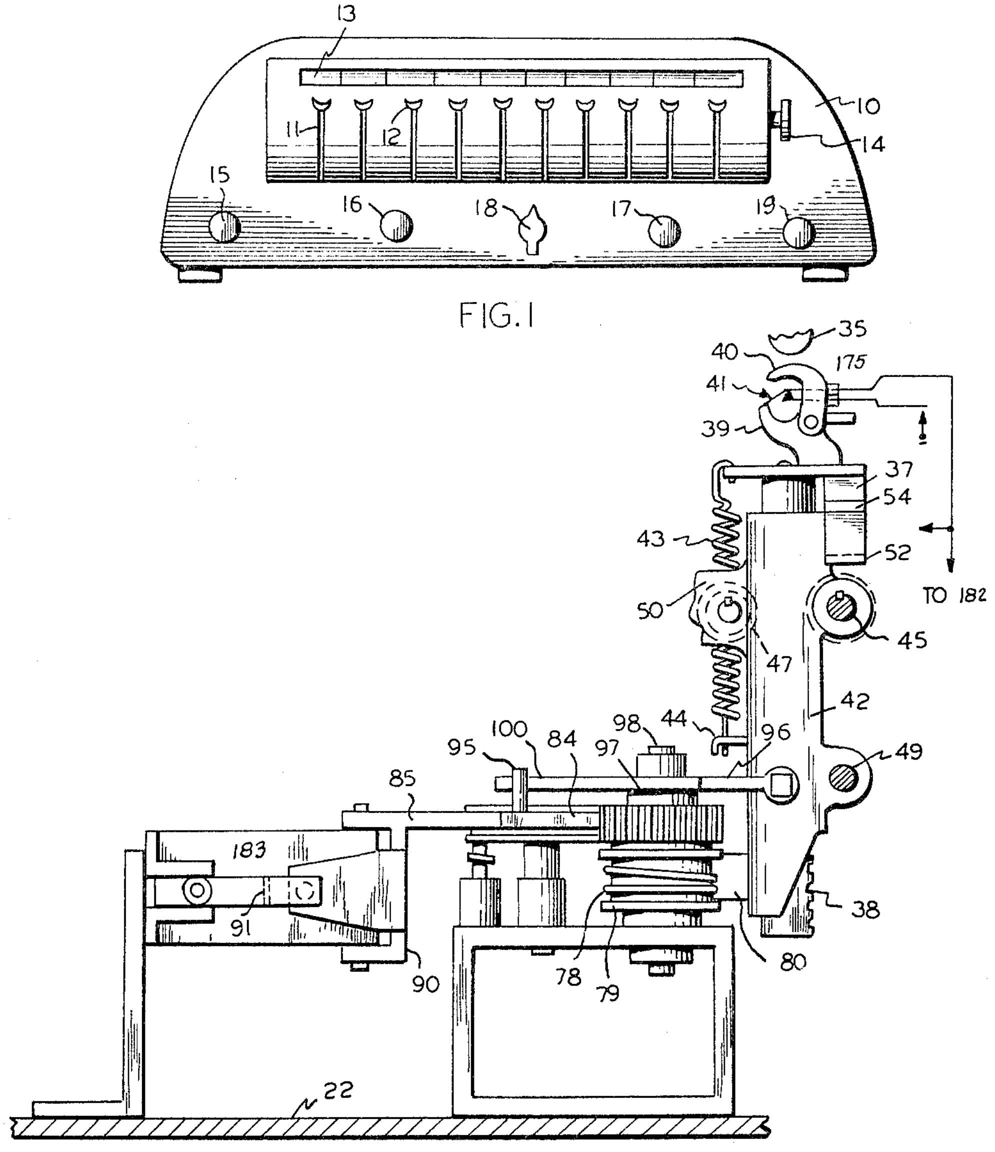
FIG. 1 is a front elevation of the invention showing the dial setting keys and manual controls.
FIG. 5 is a sectional fragmentary elevational view showing the horizontal driving motor for the dialing unit.

Referring now to FIGURE 1, the translating, dialing, and control apparatus includes a housing 10 having a series of spaced vertical slots 11 formed through the front wall and in which the arms of the keys 12 are freely slidable for adjusting the apparatus for the telephone number to which incoming calls are to be transferred; a window 13 being located above the top of each slot through which the digits to which the keys are set are directly visible; there also being a manual release 14 for simultaneously releasing all of the keys for resetting, or for non-operation of the dialing apparatus.

Also included is a switch 15 for control of direct answering of incoming calls or for translation to a different telephone number, and controls 16 and 17 for the first and second telephones 200 and 201 (shown in FIGURE 8); an intercept control 18, and a pilot control 19.

Figure 7:
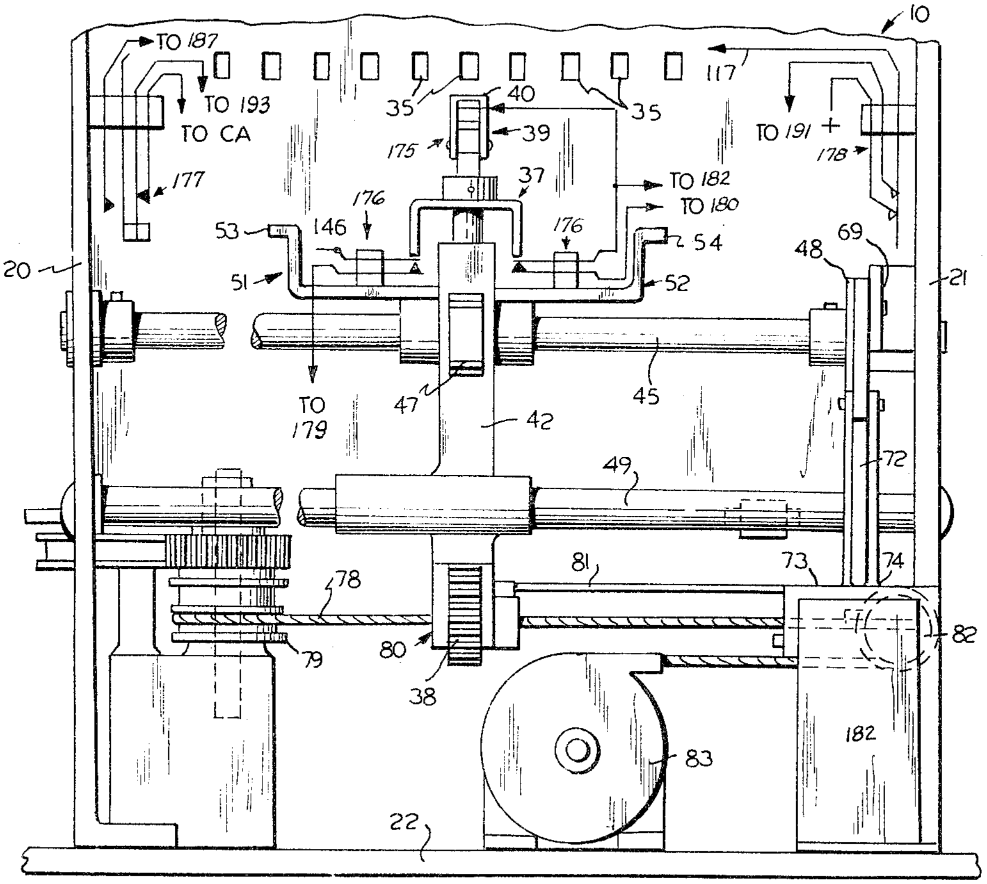
FIG. 7 is a fragmentary rear elevation showing the horizontal travel control and return apparatus.

As shown in FIGURE 7, the translating, dialing, and control apparatus and operating means, and wiring, are mounted and supported in a frame which includes side walls 20 and 21, and a bottom wall 22 which latter may also provide the base for the housing 10.

Figure 2:
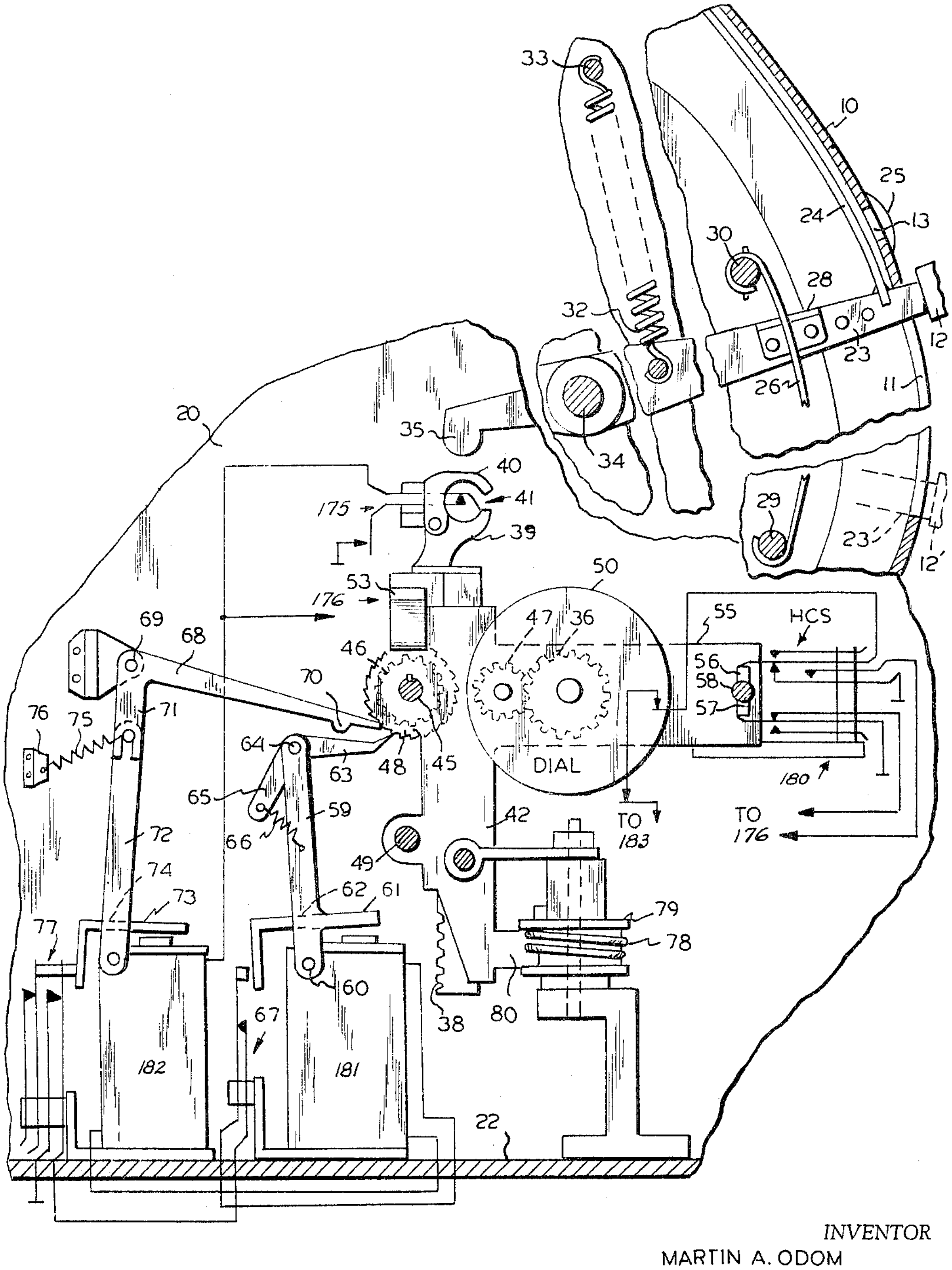
FIG. 2 is a sectional end elevation showing the dial setting and dialing apparatus in operating position.
Figure 4:
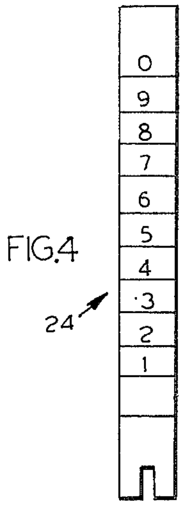
FIG. 4 is a front elevation of the dial setting index plate.

As shown in FIGURE 2, the key arms 23 project through the front of the housing, the slots 11 being sufficiently wide to permit lateral springing of the key arms, each of the key arms having an index plate 24 projecting upwardly therefrom and provided with a series of digits ranging from a blank at the lower end, through numbers 1 through 9 and zero as shown in FIGURE 4, in which numbers and blanks are directly visible selectively through the lens 25, considerably magnified.

Figure 3:
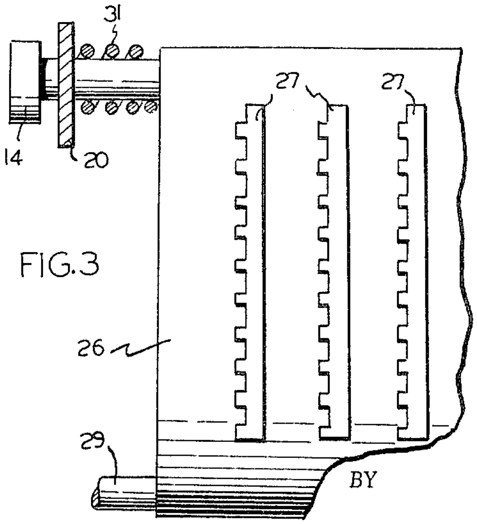
FIG. 3 is a fragmentary elevation of the latch plate with one form of release.

As shown in FIGURE 3, a latch plate 26 has a series of vertical slots 27 registrable with the key arm slots in the housing, and having lateral recesses formed in one wall of each slot for engagement by the catch 28, shown in FIGURE 2, for releasably securing the key arms in the respective digit selected positions.

Referring now again to FIGURE 2, the latch plate is slidable on one rod 29, and fixed to the other rod 30, and the latch plate is resiliently urged to the catch engaging position by a spring 31 which is shown at the knob end, under which arrangement, retraction of the knob will release the catches, while if the spring is placed at the other end of the rod, the catches will be released by pressing the knob in.

The key arms are individually retracted to the upper position by springs 32 which are connected between the respective arms and a rod 33, the respective ends of which are supported by the end walls 20 and 21, thus normally maintaining the keys in their upper, non-dialing position. The key arms are rotatably mounted on a shaft 34 which also has its respective ends supported by the end walls 20 and 21. Each arm has an extension inwardly from its shaft bearing to provide a release 35 for the dialing element, limiting vertical travel thereof in conformity with the respective key settings.

The dialing apparatus includes a rack 38 on the top of which is mounted a control element 39 having a depressable head 40 which is cooperatively related to the release 35, and which head includes a normally closed switch 41 which is opened to break the circuit to the operating motor and when the head engages the release and is moved upwardly sufficient to open the switch.

As shown in FIGURE 5, the rack 38 is slidable in the housing 42 and is normally retracted by a spring 43 which is anchored to the lower portion of the rack housing as indicated at 44.

Referring again to FIGURE 2, a splined shaft 45 is rotatably supported by the walls 20 and 21, and has a pinion 46 cooperating with the rack on one side, and a second pinion 47 is rotatably mounted in cooperation with the rack on the opposite side, the rack housing being slidable on the shaft 45.

A ratchet 48 is mounted on the shaft 45 adjacent one end wall. A second support for the rack housing is provided by a shaft 49 on which the rack housing is slidable, this shaft being supported at its opposite ends by the walls 20 and 21.

The dial 50 is of conventional internal construction with the exception that it is operated by the pinion 47 which meshes with a gear 36 for winding the dial, but which pinion is free on the shaft, with the gear 36 engaging in one direction to wind the dial as the rack travels upwardly, and freeing the dial for normal return under its own power as the rack is retracted by the spring 43.

The upper vertical end switch 175 is normally closed, and opens when the translator arm 35 is engaged by the head 40, with further movement depressing the head 40 to open the switch to break the circuit to the operating and control means.

The lower vertical end switch 176 is also normally closed, and opens to break a circuit with initial upward movement of the rack.

Referring now to FIGURE 7, the rack housing has two lateral extensions 51 and 52 on which the vertical end switches, (lower) are mounted, and which are controlled by the yoke 37.

Fingers 53 and 54 cooperate respectively with the carriage limit switch 177 and with the carriage off normal switch 178 at the respective limits of travel of the dialing unit.

Figure 6:
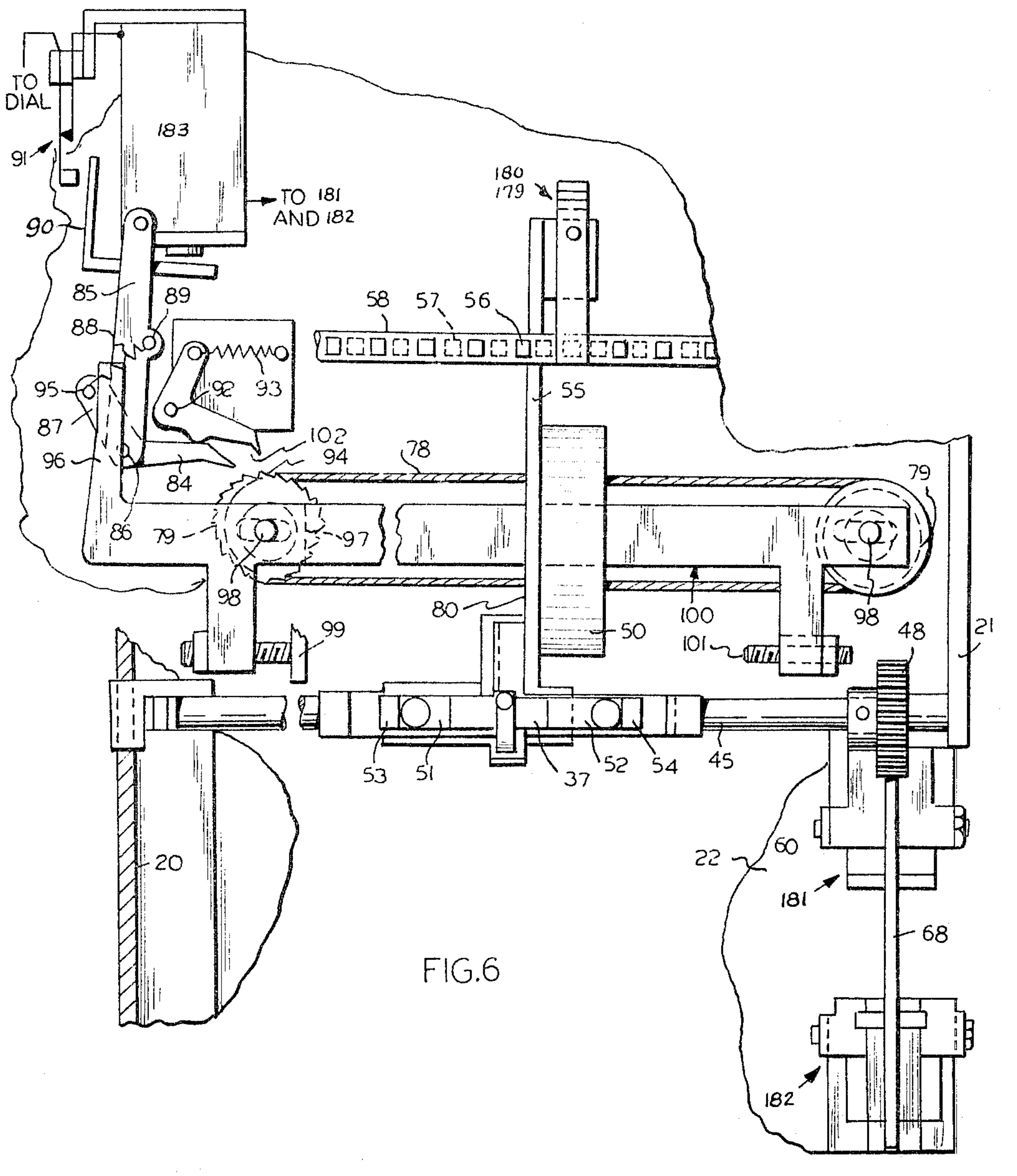
FIG. 6 is a fragmentary plan view showing the horizontal driving means and reversing means, and the vertical driving means for the dialing unit.

Referring to FIG. 6, the horizontal cam springs or switches 179 and the vertical cam springs or switches 180 are supported by an arm 55 projecting forwardly from the rack housing.

Switches 179 and 180 are controlled by the lobes 56, 57, on the cam shaft 58 which is supported by the end walls 20 and 21. The lobes are staggered, alternate cams projecting oppositely, so that the two switches are alternately reversed as the dialing unit is step driven along the supporting shafts 45 and 49, and with each step, engaging sequentially two opposed lobes, for initiating and stopping movement for each release 35.

Referring again to FIGURE 2, the ratchet 48 is operated by the motor relay 181 through an arm 59 which has its lower end pivoted to the relay housing as indicated at 60, and with the arm connected to the armature 61 as indicated at 62. The pawl 63 is pivoted to the upper end of the pawl arm as indicated at 64 and has an extension lever 65 having a resilient connection 66 to the pawl arm for normally urging the pawl into engagement with the ratchet. A normally closed switch 67 is opened with each attraction of the armature and thus through a series of impulses operates the pawl to drive the ratchet, which in turn through the shaft 45 operates the pinion 46 which drives the rack 38 upwardly until the head 40 is depressed through cooperation with the release 35 and thus breaking the circuit with both pawls retracted and freeing the ratchet, and spring 43 instantly retracting the rack or dialing element 38.

A stop and pawl release consists of a bellcrank lever 68 which is pivotally supported by the end wall as indicated at 69, with one arm engageable with the ratchet 48, and having a depending lobe 70 for depressing and releasing the pawl 63 for simultaneous release of both pawl members from the ratchet.

The other arm 71 is pivotally connected to the upper end of the operating arm 72, having its lower end pivotally supported by the relay 182 and with the lower end connected to the armature 73 as indicated at 74, the arms 71 and 72 forming a knuckle, the joint of which is normally retracted by a spring 75 which is anchored to the end wall as indicated at 76. The armature 73 also controls a switch 77 which is normally open.

Referring to FIGURE 7, the translating or dialing unit as previously mentioned, is slidable on and supported by the shaft 45 and rod 49, and is advanced in steps in cooperative relation to the respective translator arms or releases 35 through the medium of a chain or other flexible member, such as the cable 78 which is wrapped about and operates between the sheaves 79, one strand of the cable being attached to the translating unit at 80. Travel of the unit is against the urgence of the take-up reel through the flexible member 81 which passes about a sheave 82 which is mounted on a horizontal axis, with the flexible member retracted into the take-up reel or spring barrel 83 when the translating unit is released following a dialing operation.

As shown in FIGURE 6, the flexible element 78 is operated and controlled by a pawl 84 which is intermediately pivoted to the operating arm 85 as indicated at 86, the pawl having a crank arm 87 with a spring 88 connecting between the arm 87 and the lever 85 as indicated at 89.

The operating arm has its other end pivotally supported by the horizontal motor relay 183 and is also connected to the armature 90 and which armature controls a switch 91.

A combined latch and pawl release is pivotally supported by the end wall as indicated at 92 and is urged by the spring 93 to engage the ratchet 94 but retained in clearing relation by the pawl 84, the pawl being retained in the position shown from the completion of a dialing operation until the translating and dialing unit has returned to its normal position by the pin 95 which is in engagement with the arm 96 of the reversing unit which is slidable on the supports 97 and guided by the shafts 98 of the sheaves 79.

In the position shown at 99, a dialing operation has just been completed, and the reversing unit 100 has been moved to the ratchet release position, permitting the take-up 83 to retract the dialing unit, which, when engaging the stop 101, will force the reversing unit to the opposite position, with the pawl 84 and latch 102 cooperative with the ratchet 94, and will remain in that position until the completion of another dialing operation and coincidently therewith, the pawl and latch will again be moved to the ratchet release position for return of the dialing unit.

Closing the switch 15 places the call diverter in transfer dialing and alarm condition, closing the battery or current supply to the diverter system, and lights the pilot lamp 103.

Figure 8:
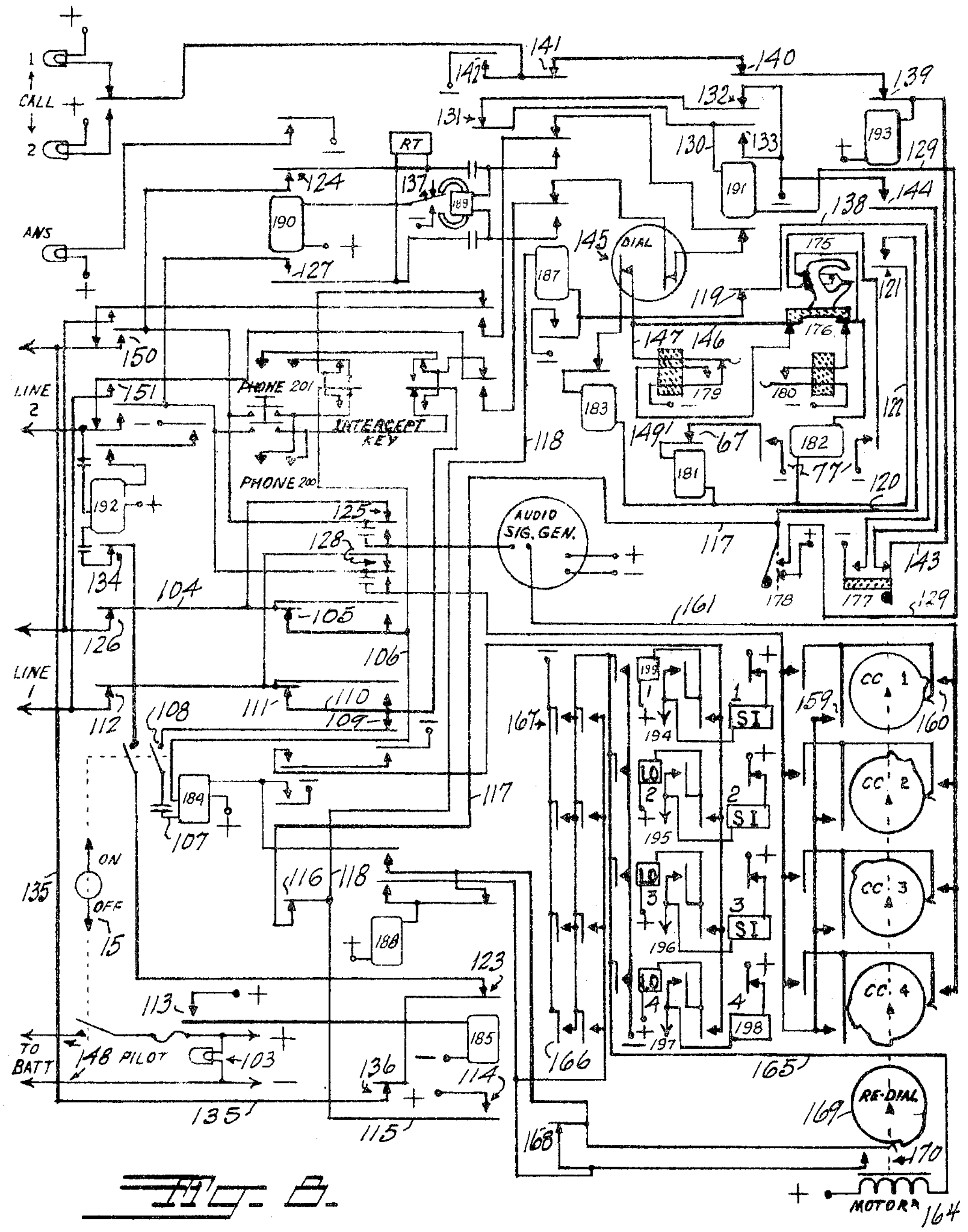
FIG. 8 is a complete wiring diagram outlining the dialing, translating, alarm, normal telephone operation and the control apparatus and circuits therefor.

Referring now to FIGURE 8, a circuit is completed from central office line 1 through connection 104, switch 105, connection 106, to relay 184, thence through connection 107 to switch contact 108, switch 109, connection 110, switches 111 and 112 to the other side of line 1.

The two switches in axial alignment with relay 184 are controlled by this relay which includes a slow release circuit interposed in the circuit just described.

The slow release circuit of relay 184 operates through the ringing impulses on line 1, and controls the dialing process of the translator through residual retention over a period in excess of the interval between rings of the telephone, closing the circuit through switch 113 to relay 185 and thence to minus, energizing relay 185 to close switch 114 and completing circuit through connection 115 and switch 116 to switch 178 through connection 117. The carriage off normal switch 178 is mechanically controlled and is normally closed to complete circuit to the positive side of the current supply, and is opened as the dialing unit returns to its initial pre-dialing position.

A second connection is completed through connection 118 to relay 184, switch 119, to one side of mechanical switch 177 which limits transverse travel of the dialing unit. A circuit is also completed from connection 117 through connection 120, switch 121 and connection 122 to the vertical control relay 182, to the vertical relay motor 181 and to the horizontal motor 183. Relay 182 controls operation of motor 181. Relay 183 provides transverse step travel of the dialing unit, while relay 181 vertically operates the dialing element or rack which winds the dial for each digit.

Relay 185 coincidently breaks circuit through switch 123 to relay 188. Relay 189 closes circuit to relay 190 when call line answers, with relay 190 closing circuit to the answer pilot lamp, and completes circuit through switches 124 and 125, connection 104, and switch 126, to one side of service line 1; and through switches 127, 128 and 112, to the other side of service line 1, with relay 184 maintaining the circuits and controlling the switches shown in axial alignment therewith, and in turn being controlled by polarized relay 189.

Relay 191 is controlled by relay 185 and switch 178, circuit being completed at 114 when relay 185 is energized and switch 178 closes as finger 54 is retracted through initiation of a dialing operation, thus releasing the switch blade for closing the circuit from positive through connection 129 to relay 191, thence through connection 130, switch 131, switch 132 to negative; and upon energization of relay 191, the latter circuit is interrupted at 132 and completed by switch 133 to complete the circuit to negative, relay 191 controlling all axially aligned switches.

The circuit descriptions apply to incoming calls on either service line, with the exception that relay 192 is included in the circuits when the incoming call is on service line 2. With the manual switch 15 closed, and the translator keys set to the desired forwarding or out-dialing number, an incoming call on line 2 completes circuit from one side of line 2 through relay 192, switch 134 to switch 15; and switches 123 and 136 to the other side of line 2 through connection 135, with relay 192 controlling all axially aligned switches.

The circuit is completed to relay 190 by polarized relay 189, from positive, through relay 190 and switch 137.

Coincident with the terminal movement of the dialing unit, finger 53 of switch 177 control, engages the switch blade and breaks the circuit to relays 193 and 191, and completes circuit through connection 138 and switch 119 to relay 187 controlled by relay 185.

Relay 193 is controlled by relay 185 from positive through switches 139, 140 and 141, under control by relay 185 through switch 142; and also controlled by switch 177 through connection 143 and switch 144, to negative.

Current is delivered to the translator apparatus from the source 148 through switch 114, (which is controlled by relay 185, which in turn is controlled by relay 184 through switch 113), through connection 115, switch 116, connection 117, connection 120, switch 121 under control of relay 193, connection 122, to vertical motor 181 under control of relay 182 controlled by switches 175 and 176 of the dialing unit, and to the vertical operating motor 181, and to the horizontal operating motor 183, to the dial off-normal switch 145, and thence through connection 146 to switch 176 and connection 147 under control of switch 179 to negative.

Referring again to FIGURE 6, the horizontal motor step drives the dialing unit along its supporting shafts 45 and 49 under control of the opposed lobes on the cam shaft, initially stopping the dialing element directly under the first release 35. The vertical contact springs 180 will just have passed over a lobe 56 on the camshaft 58, closing circuit to the vertical motor 181 and breaking circuit to the horizontal motor 183. Referring to FIGURE 2, the motor 181 operates through a series of impulses, operating the pawl to advance the ratchet 48, thereby rotating the shaft 45 and pinion 46 to drive the rack upward to cooperation of the head 40 with the release 35, the head being depressed and breaking the circuit through switch 175.

This operation winds the dialing mechanism through the medium of the pinion 47 in a manner similar to the normal finger dialing operation.

With the breaking of the circuit through 175, spring 43 instantly retracts the rack as catch 68 and pawl 63 are retracted from the ratchet by the spring 75. Referring to FIGURE 8, the dial "off-normal" switch 145 is connected in series with the horizontal motor 183 for maintaining the dialing unit in the instant position until the dialing element has returned to its normal position, with the dial dialing the digit as it returns through its inherent urgence.

Referring to FIGURE 6, at the time that switch 180 passed over the depending cam lobe 57, switch 179 was operated by the opposite sequential cam lobe 56 which disrupted the horizontal motor circuit and coincidently completed circuit from negative through the central contact of 179, through connections 149 and 146, and switch 145 to 183 as shown in FIGURE 8.

The horizontal motor is thus placed in operation, moving the dialing unit to the next position in registry with the next sequential release, controlled and positioned through the medium of the next pair of axially spaced opposed cam lobes, for dialing the next digit.

Referring to FIGURE 7, as the dialing unit reaches the end of its step movements, with the dialing completed, the finger 53 engages switch 177 referring to FIGURE 8, the circuit is interrupted to the horizontal motor 183 through de-energization of relay 193, which releases switch 144 to open, the pawl and latch being released from ratchet 94 as shown in FIGURE 2, with the spring barrel takeup 83, shown in FIGURE 7, returning the dialing unit to its normal position with the finger 54 breaking the circuit through both contacts of switch 178 as indicated, to the horizontal motor which will remain inoperative until another forwarding call is received. The operations previously described will then be repeated.

Referring again to FIGURE 8, if a forwarding call come in on line 2, it will be forwarded on line 1, with the transfer completed from one side of 2 through relay 192 controlling switches 150 and 151, with relay 184 controlling the circuit to relay 185 which in turn controls the circuit to the translating apparatus.

Following initiation of a translation or re-dialing operation, a disconnect on the calling line will restore all relays to normal in the line control circuits, and the dialing apparatus will return to normal dialing initiating position, ready for the next call diversion.

The alarm circuits include the translating and diverting circuits previously described. Relay 188 operates from an external alarm or signal circuit, and number of alarm or signal circuits may be incorporated, four being indicated as 194, 195, 196, and 197.

When any of these alarm circuits are completed to ground through an alarm or signal installation, a circuit is completed to the associated relay 198 through the respective leads indicated by the arrow heads in the alignment of the system numbers 194 to 197. For example with alarm circuit 194.

A connection from positive through relay 198 completed through the alarm or signal circuit 194. Energization of relay 198 closes switch 159 to the code cam switch 160 with the lobes on the cams controlling the switch which has connection 161 to the audio signal generator. Relay 198 simultaneously closes a circuit to the lockout relay 199 which maintains the alarm system in operation while terminating dialing after the call has been answered on the telephone, and terminates the coded signals only when the alarm or signal system has been reset or restored.

Rotary motor 164 is connected in circuit from positive through connections 165 and 166, through switch 167 which was closed by relay 198, to negative, and which motor operates the re-dial cam and the several code cams in unison.

Re-dialing is controlled by the switch 168 which in turn is controlled by relay 187 and by re-dial cam 169 through the switch 170. The code cams complete circuit through the respective switches 160 and connection 161 to the audio signal generator, while the re-dial circuit is completed through relay 188 which then controls all of the switches in axial alignment therewith; all switches in axial alignment with each of the respective relays, constituting a multiple switch.

Relay 188 is operative when relay 185 is inoperative. The operative condition of relay 185 indicates that a call is in progress. When an alarm exists, the coded tone will be introduced into the line circuits irrespective of any possible busy condition of the apparatus. If the busy condition is the result of a previous alarm still in progress, the coded tone will be superimposed on the previous alarm.

The two alarms can be identified or detected by the staggered arrangement of the code pulses as controlled by the number of arrangement of lobes on the respective cams, the lobes operating the switches 160 for making and breaking the circuits to the audio signal generator. The cams may be driven at any suitable speed, depending on the diameter of the cams, the maximum number of lobes (the greater the number of lobes on a cam, the slower should be the speed), a speed of about 1 r.p.m. proving satisfactory in the majority of installations.

The re-dial cam has a single lobe for breaking the circuit to relays 188 and 184 about once a minute so that the call diverter will continue to re-dial in the event that the number dialed by the call translating apparatus is busy.

This alarm circuit is adaptable to many other uses, as in connection with indications of temperatures, machine control, and similar purposes.

I claim:

1. In a telephone instrument including a plurality of telephone service lines in comunication with a telephone exchange and including a first subscribers telephone installation normally operable for incoming and outgoing calls, call transfer means comprising a series of manually adjustable elements each provided with a series of digits and respectively adjustable to the respective digits of a telephone number, and each having a release member adjustable therewith, a telephone dial, dialing means, and power means sequentially moving said dialing means through a sequence of positions corresponding to the positions of said release members, said dialing means having a dialing element, and power means for operating said dialing element for winding the dial with winding terminated upon contact of a moving sensing element with the release member at each of said positions of the dialing means, with the release member releasing the dialing element for return to its initial position to initiate the next sequential movement of the dialing means, electrically operated and controlled means for initiating operation of said dialing means upon reception of an incoming call on a first of said service lines and for coupling said first service line and said dial to a second of said service lines.

2. Call transfer means as defined in claim 1, wherein said second service line is connected to a second telephone instrument normally operable for incoming and outgoing calls, and a circuit biasing a portion of the first mentioned circuit for operation of the dialing means and diversion of the call from said second of said service lines over the first of said telephone service lines.

3. Call transfer means as defined in claim 1, an alarm circuit included in the previously mentioned circuit for operation of the dialing means, and including coded audible signaling means and operating means therefor for dual signaling of an emergency.

4. Call transfer means as defined in claim 1, in which said series of manually adjustable elements includes a key for each digit of a telephone number, and each including means indicating the digit to which the key is adjusted, each of said keys having an arm terminating in a common pivotal mounting, with the release member being formed as an extension of the arm from the pivotal mounting and therefore being adjustable with the key for limiting movement of the dialing element in conformity with the digit setting of the key for limiting the dial winding for the specific digit.

5. Call transfer means as defined in claim 1, in which said dialing means includes a relay, and a ratchet and pawl operated thereby and control means therefor, for sequential movements of the dialing means, with the dialing element including a rack having a pinion engaged therewith and coupled to the dial, with the coupling being releasable upon said contact of the sensing element of the dialing element with the releasing member for retraction to the initial position and normal return of the dial to the initial position thereof through its inherent retracting means for dialing the digit.

6. In a telephone installation having a plurality of service lines in communication with a telephone exchange with a first of said service lines being coupled to a telephone instrument which is normally operable to receive and transmit calls, a means for automatically diverting incoming calls to a pre-selected distant telephone number through a second of said service lines, said call diverting means comprising a telephone number selecting mechanism having a plurality of spaced apart digit indicating elements each selectively adjustable to indicate a digit of said distant telephone number, a dialing mechanism support extending along said plurality of spaced apart digit indicating elements, a telephone number dialing mechanism mounted on said support for travel therealong, a first drive means for step advancing said dialing mechanism along said support to a plurality of positions thereon corresponding to the positions of said digit indicating elements of said number selecting mechanism, a second drive means winding and releasing said dialing mechanism at each of said plurality of positions thereof in accordance with the setting of the digit indicating element corresponding to said position, means retracting said dialing mechanism to the initial position thereof following the completion of said stepped movement along said support, and a ringing signal detector coupled to said first service line and connected to said first and second drive means to initiate operation thereof and to connect said first service line to said second service line following detection of an incoming call.

7. In a telephone installation having a plurality of service lines in communication with a telephone exchange with a first of said service lines coupled to a telephone instrument for receiving and transmitting calls, a system for diverting an incoming call to a pre-selected remote telephone number comprising, in combination, a plurality of spaced apart digit indicating elements each being adjustable to indicate one of the digits of said remote telephone number, manually releasable means for holding said digit indicating elements at a selected setting thereof, a dialing mechanism coupled to a second of said service lines, a first electrical drive means coupled to said dialing mechanism for advancing said dialing mechanism through a sequence of positions corresponding to the positions of said spaced apart digit indicating elements, a second electrical drive means winding and releasing said dialing mechanism at each of said positions thereof in accordance with the setting of the digit indicating element corresponding to each position, means for returning said dialing mechanism to the initial position thereof following movement through said sequence of positions thereof, a manually operable switch having an open and a closed position, and a ringing signal detector coupled to said first service line through said switch and connected to said first and second drive means to initiate operation thereof and to connect said first service line to said second service line following receipt of a ringing signal through said first service line and said switch.

No references cited.

KATHLEEN H. CLAFFY, *Primary Examiner.*

ROBERT H. ROSE, *Examiner.*

H. W. GARDNER, S. J. BOR, *Assistant Examiners.*

Dedication 3,268,666.—*Martin A. Odom*, Oakland, Calif. CALL DIVERTOR TRANSLATORS. Patent dated Aug. 23, 1966. Dedication filed Jan. 3, 1972, by the assignee, *Ford Industries, Inc.*

Hereby dedicates to the Public the entire remaining term of said patent.

[*Official Gazette July 18, 1972.*]